April 15, 1941.  C. M. BRANCH  2,238,305
GUARD FOR MOWERS
Filed April 5, 1940
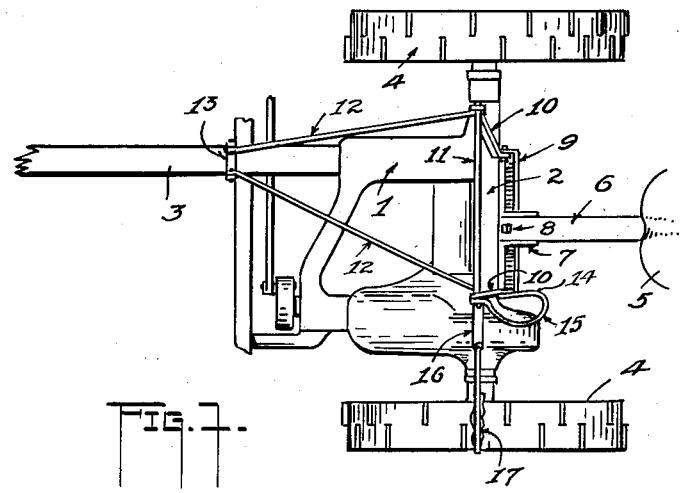
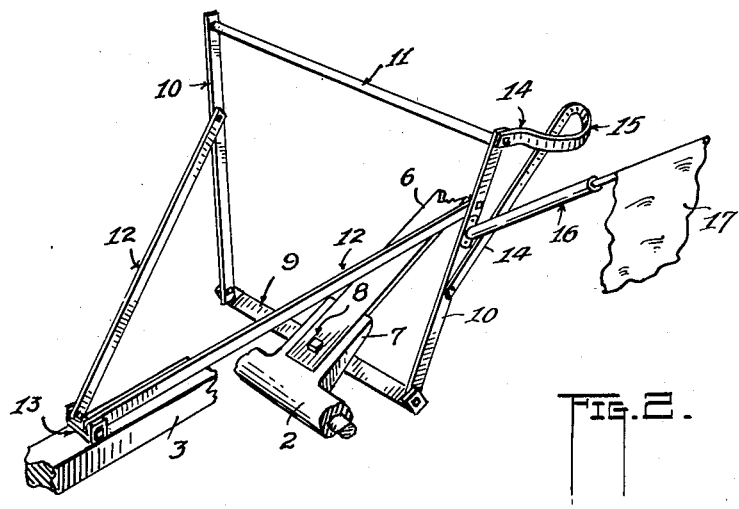
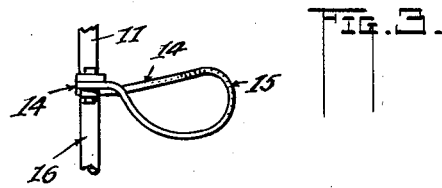
Inventor
C. M. Branch,
By L. M. Thurlow
Attorney Patented Apr. 15, 1941

2,238,305

UNITED STATES PATENT OFFICE 2,238,305

GUARD FOR MOWERS

Clarence M. Branch, Mason City, Ill.

Application April 5, 1940, Serial No. 328,023

3 Claims. (Cl. 56—1)

This invention pertains to guards for farming implements, particularly of the mower type.

The object of the invention is to provide a guard directly forward of the usual rider's seat for preventing the rider being thrown or pitched forward and injured should breakage of parts come about.

Another object is to provide a guard forward of the seat which shall include a portion at one side of the driver for the reception of the driver's arm to thus prevent his unseating in a sidewise tipping of the mower as sometimes happens.

To the end that the invention may be thoroughly understood the appended drawing is provided wherein Figure 1 is a plan of a mowing machine showing the guard of my invention mounted thereon;

Figure 2 shows the guard in perspective together with parts of the mowing machine carrying it, and Figure 3 is a plan of part of the guard on a larger scale than shown in Figure 1.

A mowing machine is illustrated wherein 1 and 2 denotes the frame and axle portions respectively, 3 the tongue, and 4 the wheels, while 5 indicates the usual seat with its support 6.

The mower frame, or the axle 2, in this instance, usually carries the seat-support 6 by means of an extension 7 against which latter the said seat-support rests, a bolt 8 serving to secure one relative to the other and the guard of my invention may be very conveniently supported at this position. That is to say, a cross-member 9 substantially paralleling the axle 2 may be secured by the said bolt 8 while two upright members 10 may arise from the said cross-member in spaced positions while a hand-rail or bar 11 is supported by and between said members in such position as to lie somewhat above and forward of the seat 5.

In order that the structure 10, 11 thus provided may be rigidly supported a pair of struts 12 are separately attached to said members 10 and extend forwardly and downwardly to the tongue 3 as a convenient point, the members being attached to a bracket 13, for example, secured to said tongue.

While I have described the manner of mounting the guard in this particular instance, it is to be understood that other ways of supporting it may be employed as it is not my intention to be confined to the exact manner shown.

Under conditions that sometimes present themselves, and not necessary to relate, the rider or operator is in great danger of being thrown forwardly ahead of the implement with danger to his person. However, by erecting a guard of some such nature forward of the seat the operator is not exposed to danger but may retain his mounted position by grasping the named guard.

There are other dangers besides the foregoing, also, in that sometimes the mower is caused from one reason or another to be tilted toward the left of the seated operator at which time he is again exposed to danger by being unseated sidewise. To meet this there is provided an auxiliary guard consisting of a bar 14 extending from one of the members 11 rearwardly and outwardly and thence inwardly in a curved portion 15 forming a stirrup, the bar thence extending downwardly and having attachment to the member 10 as a convenient point, the position of the stirrup being such that the operator's arm will naturally be caught in it while he is seated should the mower be tilted so far as to tend to unseat him.

Whether working in the field or upon paved highways where marginal tracts are kept trimmed the noted dangers are sometimes present, but in any event the guard or its equivalent offers the safety measure.

For use in highways a support shown at 16 serves to carry a flag 17 as a warning to traffic.

I claim:

1. In a guard for mowing machines, the combination with a mower frame and a rider's seat, of a cross member affixed to a part of the frame, a pair of members uprising from the cross member and having fixed relation thereto, the members of the pair being spaced apart and lying at opposite sides of a line passing through the seat and paralleling the direction of travel of the mower, a bar secured to and extending between the members forward of the seat, and a guard portion fixed with respect to one of the members and extending rearwardly therefrom and substantially paralleling the line of travel.

2. In a guard for mowing machines, the combination with a part of the mower structure and a rider's seat, of a support comprising a pair of members fixed relative to the said structure and arising therefrom, a rail extending in a transverse direction between the members and rigid relative to both the latter, said members of the pair lying at opposite sides of a line extending through the seat and paralleling the line of advance of the mower, and a guard portion fixed with respect to support and extending rearwardly therefrom substantially paralleling the line of advance, said guard lying in a line spaced from the seat and paralleling said line of advance.

3. The invention according to claim 1 including a bracing strut affixed to one of the members, the same substantially paralleling the line of advance and affixed to a part of the mower structure.

CLARENCE M. BRANCH.